(12) United States Patent
Wilairat

(10) Patent No.: US 9,027,117 B2
(45) Date of Patent: May 5, 2015

(54) MULTIPLE-ACCESS-LEVEL LOCK SCREEN

(75) Inventor: Weerapan Wilairat, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 12/897,586

(22) Filed: Oct. 4, 2010

(65) Prior Publication Data

US 2012/0084734 A1    Apr. 5, 2012

(51) Int. Cl.
*G06F 21/00* (2013.01)
*G06F 21/62* (2013.01)
*G06F 21/36* (2013.01)

(52) U.S. Cl.
CPC .............. *G06F 21/629* (2013.01); *G06F 21/36* (2013.01)

(58) Field of Classification Search
CPC .......... G06F 21/36; G06F 21/32; G06F 21/31
USPC ...................................... 715/863; 726/17, 21
See application file for complete search history.

(56) References Cited

U.S. PATENT DOCUMENTS

| | | |
|---|---|---|
| 6,286,001 B1 | 9/2001 | Walker et al. |
| 6,339,826 B2 | 1/2002 | Hayes, Jr. et al. |
| 6,405,033 B1 | 6/2002 | Kennedy, III et al. |
| 6,446,069 B1 | 9/2002 | Yaung et al. |
| 6,504,480 B1 | 1/2003 | Magnuson et al. |
| 6,546,002 B1 | 4/2003 | Kim |
| 6,549,768 B1 | 4/2003 | Fraccaroli |
| 6,650,189 B1 | 11/2003 | Romao |
| 6,662,023 B1 | 12/2003 | Helle |
| 6,920,455 B1 | 7/2005 | Weschler |
| 6,941,134 B2 | 9/2005 | White |
| 7,058,659 B2 | 6/2006 | Ryu |
| 7,076,797 B2 | 7/2006 | Loveland |
| 7,142,848 B2 | 11/2006 | Owen et al. |

(Continued)

FOREIGN PATENT DOCUMENTS

| | | |
|---|---|---|
| CN | 101778165 A | 7/2010 |
| CN | 101828162 A | 9/2010 |
| KR | 10-2010-0083396 | 7/2010 |

OTHER PUBLICATIONS

Moran, "Get Started with Windows 7", 2009, ISBN-13 (pbk): 978-1-4302-2503-4.*

(Continued)

*Primary Examiner* — Jeffrey Pwu
*Assistant Examiner* — Thong Truong
(74) *Attorney, Agent, or Firm* — Aaron Chatterjee; Kate Drakos; Micky Minhas

(57) ABSTRACT

A multiple-access-level lock screen system allows different levels of functionality to be accessed on a computing device. For example, when a device is in a locked state, a user can select (e.g., by making one or more gestures on a touchscreen) a full-access lock screen pane and provide input that causes the device to be fully unlocked, or a user can select a partial-access lock screen pane and provide input that causes only certain resources (e.g., particular applications, attached devices, documents, etc.) to be accessible. Lock screen panes also can be selected (e.g., automatically) in response to events. For example, when a device is in a locked state, a messaging access lock screen pane can be selected automatically in response to an incoming message, and a user can provide input at the messaging access lock screen pane that causes only a messaging application to be accessible.

19 Claims, 12 Drawing Sheets

(56) References Cited

U.S. PATENT DOCUMENTS

| | | | |
|---|---|---|---|
| 7,171,557 B2 | 1/2007 | Kallahalla et al. | |
| 7,212,613 B2 | 5/2007 | Kim et al. | |
| 7,222,360 B1 | 5/2007 | Miller | |
| 7,272,388 B2 | 9/2007 | Andrew et al. | |
| 7,274,925 B2 | 9/2007 | Chaar et al. | |
| 7,346,921 B2 | 3/2008 | Murren et al. | |
| 7,366,798 B2 | 4/2008 | Nordstrom et al. | |
| 7,408,506 B2 | 8/2008 | Miller | |
| 7,530,099 B2 * | 5/2009 | Flurry et al. | 726/8 |
| 7,657,849 B2 | 2/2010 | Chaudhri | |
| 7,668,830 B2 | 2/2010 | Hakala | |
| 7,958,562 B2 | 6/2011 | Gaucas | |
| 2002/0044149 A1 | 4/2002 | McCarthy et al. | |
| 2003/0139192 A1 | 7/2003 | Chmaytelli et al. | |
| 2004/0039909 A1 | 2/2004 | Cheng | |
| 2005/0107114 A1 | 5/2005 | Ocock | |
| 2005/0138110 A1 | 6/2005 | Redlich et al. | |
| 2005/0143171 A1 | 6/2005 | Loose | |
| 2006/0246872 A1 | 11/2006 | Tarkkala | |
| 2007/0028176 A1 | 2/2007 | Perdomo et al. | |
| 2007/0046423 A1 | 3/2007 | Baucom | |
| 2007/0072616 A1 | 3/2007 | Irani | |
| 2007/0150826 A1 | 6/2007 | Anzures et al. | |
| 2007/0150842 A1 * | 6/2007 | Chaudhri et al. | 715/863 |
| 2007/0180509 A1 | 8/2007 | Swartz et al. | |
| 2007/0300140 A1 * | 12/2007 | Makela et al. | 714/799 |
| 2008/0020803 A1 | 1/2008 | Rios et al. | |
| 2008/0080688 A1 | 4/2008 | Burgan et al. | |
| 2008/0082693 A1 | 4/2008 | Meijer et al. | |
| 2008/0101658 A1 | 5/2008 | Ahern et al. | |
| 2008/0154780 A1 | 6/2008 | Soukup et al. | |
| 2008/0254767 A1 | 10/2008 | Jin | |
| 2009/0089886 A1 | 4/2009 | Cheng et al. | |
| 2009/0116703 A1 | 5/2009 | Schultz | |
| 2009/0157560 A1 | 6/2009 | Carter et al. | |
| 2009/0158389 A1 | 6/2009 | Waltenberg et al. | |
| 2009/0265794 A1 | 10/2009 | Apelqvist | |
| 2009/0282473 A1 | 11/2009 | Karlson et al. | |
| 2010/0020035 A1 | 1/2010 | Ryu et al. | |
| 2010/0066821 A1 | 3/2010 | Rosener et al. | |
| 2010/0115610 A1 | 5/2010 | Tredoux et al. | |
| 2010/0134310 A1 | 6/2010 | Zheng et al. | |
| 2010/0162180 A1 | 6/2010 | Dunnam | |
| 2010/0216509 A1 | 8/2010 | Riemer et al. | |
| 2010/0268779 A1 | 10/2010 | Rao | |
| 2010/0311336 A1 | 12/2010 | Huotari et al. | |
| 2011/0247045 A1 | 10/2011 | Rajagopal et al. | |
| 2011/0275321 A1 | 11/2011 | Zhou et al. | |
| 2011/0283241 A1 * | 11/2011 | Miller et al. | 715/863 |
| 2012/0023573 A1 * | 1/2012 | Shi | 726/17 |
| 2012/0046020 A1 | 2/2012 | Tomasini | |
| 2012/0100895 A1 | 4/2012 | Priyantha et al. | |
| 2012/0144468 A1 | 6/2012 | Pratt et al. | |

OTHER PUBLICATIONS

Bhandari, "Full Touchscreen Samsung Star (S5233), Star 3G (S5603) and BEAT DJ Launched in India," <http://www.tecfre.com/full-touchscreen-samsung-star-s5233-star-3g-s5603-and-beat-dj-launched-in-india/>, 19 pages, Published Date: May 11, 2009.

Chen, "Here's the Google Phone Apple Wants You to Have," <http://www.wired.com/gadgetlab/2010/03/apple-htc-google/>, 15 pages, Published Date: Mar. 5, 2010.

"T-Mobile G1 Google Android Phone—Gesture Unlocking," <http://www.gadgetuniversegift.com/?p=2121>, 4 pages, Published Date: Jun. 20, 2010.

"Setting up and Using Smart Unlock on the Samsung Jet," <http://www.knowyourmobile.com/samsung/samsungjet/samsungjetuserguides/317988/setting_up_and_using_smart_unlock_on_the_samsung_jet.html>, 3 pages, Published Date: Jun. 20, 2010.

"Mobile Phone Match-Up," <http://www.microsoft.com/windowsmobile/en-us/meet/version-compare.mspx>, 3 pages, Retrieved Date: Jul. 27, 2010.

"Manage User Accounts," <http://www.vista4beginners.com/Manage-User-Accounts>, 7 pages, Published Date: May 8, 2007.

"T-Mobile G1 User Manual," pp. 102-103, Published Date: May 27, 2009.

Notice on the First Office Action from Chinese Patent Application No. 201110317851.5, dated Dec. 4, 2013, 14 pages Patent Examination Report No. 2, Australian Patent Application No. 2011312743, Aug. 15, 2014, 4 pages.

Liu et al., "xShare: Supporting Impromptu Sharing of Mobile Phones," *In Proceedings of the 7th international conference on Mobile systems, applications, and services*, pp. 15-28, Jun. 22, 2009.

Supplementary Search Report, European Application No. 11831134.9, 3 pages, Apr. 3, 2014.

Examination Report, European Application No. 11831134.9, 5 pages, May 9, 2014.

Patent Examination Report No. 1, Australian Patent Application No. 2011312743, 4 pages, Jun. 20, 2014.

"Office Action Issued in Chinese Patent Application No. 201110317851.5", Mailed Date: May 8, 2014, 10 pages.

Notice on the Third Office Action, Chinese Patent Application No. 201110317851.5, Nov. 14, 2014, 9 pages.

First Official Action, Chilean Patent Application No. 886-2013, Jan. 27, 2015, 7 pages.

* cited by examiner

Software 1080 implementing described
techniques and tools

MULTIPLE-ACCESS-LEVEL LOCK SCREEN

BACKGROUND

Striking a balance between security, privacy and usability has become an important part of designing computing devices. For example, the ever-increasing functionality of mobile computing devices such as smartphones has made such devices more likely to be shared among several users. A common scenario occurs when a user is with a group of family members or friends, and someone in the group borrows the user's device to watch a video, look at images, listen to music, play a game, make a phone call, send a message, search for information on the Internet, etc. On the other hand, the high-level of functionality of mobile computing devices (and the high level of reliance and trust that many users have in their devices) also makes such devices more likely to contain sensitive information and pose a security risk if they are misused. Many users want to be able to share their devices without compromising their security or privacy.

Although there have been a variety of advances in balancing the security, privacy and usability of computing devices, there remains room for improvement.

SUMMARY

Technologies described herein relate to providing access to computing devices for certain tasks without unnecessarily compromising security or privacy. In examples described herein, a multiple-access-level lock screen system allows different levels of functionality to be accessed on a computing device. Different lock screen panes provide access to different levels of functionality on the device. For example, when a device is in a locked state, a user can select (e.g., by making one or more gestures on a touchscreen) a full-access lock screen pane and provide input that causes the device to be fully unlocked, or a user can select a partial-access lock screen pane and provide input that causes only certain resources (e.g., particular applications, attached devices, documents, etc.) to be accessible. Lock screen panes also can be selected (e.g., automatically) in response to events. For example, when a device is in a locked state, a messaging access lock screen pane can be selected automatically in response to an incoming message, and a user can provide input at the messaging access lock screen pane that causes only a messaging application to be accessible.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1

Exemplary Overview

Figure 1:
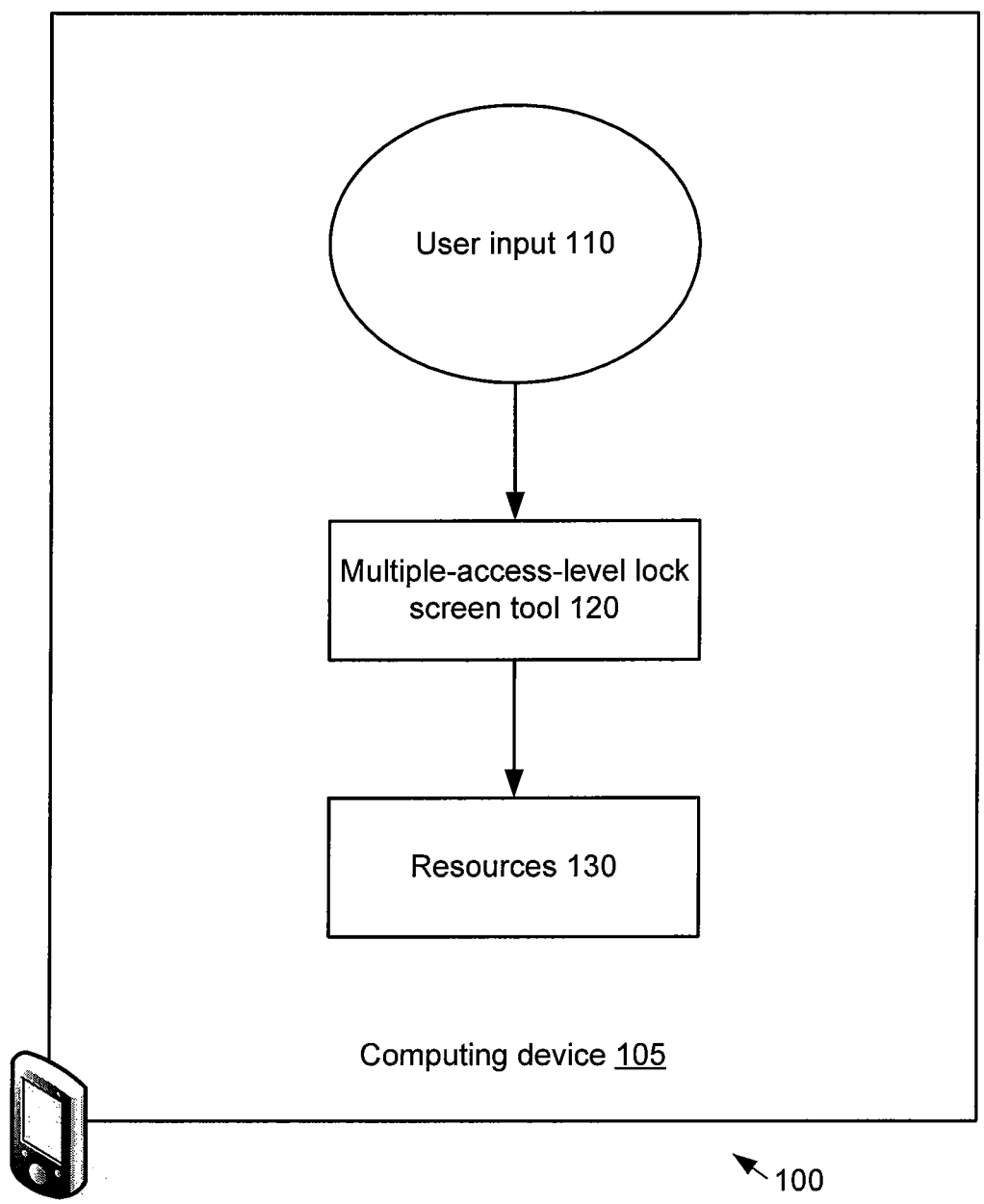
FIG. 1 is a block diagram of an exemplary system implementing one or more of the multiple-access-level lock screen technologies described herein.

Technologies described herein relate to providing access to computing devices for certain tasks without unnecessarily compromising security or privacy. In examples described herein, a multiple-access-level lock screen system allows different levels of functionality to be accessed on a computing device. Different lock screen panes provide access to different levels of functionality on the device. For example, when a device is in a locked state, a user can select (e.g., by making one or more gestures on a touchscreen) a full-access lock screen pane and provide input that causes the device to be fully unlocked, or a user can select a partial-access lock screen pane and provide input that causes only certain resources (e.g., particular applications, attached devices, documents, etc.) to be accessible. Lock screen panes also can be selected (e.g., automatically) in response to events. For example, when a device is in a locked state, a messaging access lock screen pane can be selected automatically in response to an incoming message, and a user can provide input at the messaging access lock screen pane that causes only a messaging application to be accessible.

Example 2

Exemplary Resource

The technologies described herein can be used to manage access to resources that are accessible via a computing device. Resources accessible via a computing device can include anything (e.g., devices, information, applications, etc.) that can be stored on or by a computing device, read from or by a computing device, or activated on or by a computing device. For example, an application (e.g., a web browser) stored on a computing device (e.g., a smartphone) that can be activated on the computing device is a resource accessible via the computing device. As another example, a document (e.g., a spreadsheet) stored on a remote server that can be accessed by a computing device (e.g., a smartphone) is a resource accessible via the computing device. As another example, an input device (e.g., a video camera) integrated into or connected to a computing device (e.g., a smartphone) is a resource accessible via the computing device. Any of the techniques and tools described herein can assist in managing resources such as applications, devices, documents, images, video files, audio files and the like.

Example 3

Exemplary Locked State

In any of the examples described herein, a locked state can be any state of a computing device in which the functionality accessible to a user is limited to interacting with a lock screen and providing user input to exit the locked state. Depending on the input provided by the user, the computing device may or may not exit the locked state in response to the user input. For example, a user can interact with a computing device in a locked state by selecting a lock screen pane and providing a password that causes the computing device to exit the locked state and enter an unlocked state. If the password is incorrect, the computing device can provide feedback (e.g., visual feedback) to indicate that the password is incorrect while remaining in a locked state. A computing device in an unlocked state can provide a user with access to all resources on the computing device, or less than all resources on the computing device. A computing device that exits a locked state can enter an unlocked state or some other state. For example, a computing device can enter a power-off state from a locked state when a user presses a power-off button on the device.

Example 4

Exemplary System Employing a Combination of the Technologies

FIG. 1 is a block diagram of an exemplary system 100 implementing one or more of the multiple-access-level lock screen technologies described herein. In the example, a computing device 105 implements a multiple-access-level lock screen tool 120 that accepts user input 110. The user input 110 can include touch-based user input, such as one or more gestures on a touchscreen. For example, a device operating system (OS) with a touch-based user interface (UI) system can receive touch-based user input information (e.g., gesture information such as velocity, direction, etc.), interpret it, and forward the interpreted touch-based user input information to the multiple-access-level lock screen tool. Alternatively, the user input 110 can include other input such as keyboard input.

The multiple-access-level lock screen tool 120 presents lock screen panes to a user. The multiple-access-level lock screen tool 120 manages access to resources 130 via the lock screen panes. For example, the multiple-access-level lock screen tool 120 presents a default lock screen pane and also allows the user to select other lock screen panes. The lock screen panes are associated with different access levels. For example, a default lock screen pane can be associated with access to most or all of the resources 130, and other lock screen panes can be associated with access to a smaller number of the resources 130. A user can provide user input 110 at a lock screen pane to gain access to the computing device 105 at the respective access level. The multiple-access-level lock screen tool can send lock screen information (e.g., information that identifies a selected lock screen pane) to the device OS, which can send rendering information to a display. Such rendering information can be used to animate changes in the UI (e.g., transitions from one lock screen pane to another, transitions from locked states to unlocked states, etc.) on the display. Lock screen panes and access levels are described in further detail in other examples herein.

In practice, the systems shown herein such as system 100 can be more complicated, with additional functionality, more complex relationships between system components, and the like. The technologies described herein can be generic to the specifics of operating systems or hardware and can be applied in any variety of environments to take advantage of the described features.

Example 5

Exemplary Lock Screen

In any of the examples described herein, a lock screen can include any visual information that indicates that a device is in a locked state. Typically, a lock screen is displayed on a touchscreen or other display of a computing device when the computing device is in a locked state. Although described as a lock screen, the visual information in a lock screen need not occupy the entire screen area of a display device. A lock screen may occupy all of a display area or only part of a display area, or a lock screen may be presented as an overlay (e.g., a partially transparent overlay) on top of other visual information. For example, if a collection of images is displayed on a touchscreen of a computing device, and the computing device subsequently enters a locked state (e.g., when the device has been idle for a period of time), a lock screen can be presented as a partially transparent overlay on top of the displayed images.

In any of the examples described herein, a lock screen can have plural lock screen panes, which can be associated with different access levels. Lock screen panes and access levels are described in further detail in other examples herein.

Example 6

Exemplary Access Level

In any of the examples described herein, an access level is associated with one or more resources (e.g., applications, documents, etc.) that can be accessed via a computing device. Different lock screen panes are typically associated with different access levels. For example, a lock screen pane can be associated with an access level that allows access to most or all resources accessible via a computing device, or a lock screen pane can be associated with an access level that allows access to a smaller number of resources. Lock screen panes are described in further detail in other examples herein.

In practice, an access level can be represented in any number of ways (e.g., in a data store that stores information indicating which resources are accessible at particular access levels), and can be associated with any number of resources of any type. For ease of illustration, some access levels are described in examples herein as "Access Level 1," "Access Level 2," etc. Such labels do not necessarily imply a hierarchical or sequential relationship between access levels, although such relationships may exist in practice. For example, an access level labeled as "Access Level 1" can be associated with full access to all resources on a computing device, an access level labeled as "Access Level 2" can be associated with access to less than all resources on the computing device, and an access level labeled as "Access Level 3" can be associated with a single resource (e.g., a single application) of the resources associated with "Access Level 2."

Alternatively, "Access Level 1", "Access Level 2" and "Access Level 3" can each be associated with different, individual resources. Access levels also can be labeled and/or relate to one another in other ways. For example, access levels can be labeled as "Full Access," "Enhanced Access" and "Basic Access," where "Full Access" provides access to all functionality, "Enhanced Access" provides access to most, but not all functionality, and "Basic Access" provides access to basic functionality, such as the ability to make phone calls on a smartphone.

Described techniques and tools can use any number of access levels, and access levels can provide access to any number of resources. The number of access levels and the resources associated with access levels can be adjustable (e.g., based on user settings).

Example 7

Exemplary Lock Screen Pane

In any of the examples described herein, a lock screen pane can be any visual information in a lock screen associated with an access level. In examples described herein, a lock screen comprises two or more lock screen panes, and each lock screen pane is associated with a different access level.

Typically, lock screen panes are selectable. Lock screen panes can be selected in response to user input (e.g., touchscreen input). For example, starting from an initial lock screen pane (e.g., a default lock screen pane that is displayed when a computing device enters a locked state) associated with a first access level, a user can use touchscreen gestures (e.g., gestures to the right or to the left) or other input to select other lock screen panes associated with other access levels. Lock screen panes also can be selected in response to events (e.g., an incoming text message). For example, a computing device in a locked state can display a lock screen pane associated with an access level that permits access only to a messaging application when a new message is detected. Lock screen panes also can be selected in response to a combination of user input and events. For example, a lock screen can have a lock screen pane that becomes available for selection when a particular event occurs, but is not selected automatically when the event occurs. A user can then select the newly available lock screen pane by, for example, using gestures on a touchscreen to navigate to the newly available lock screen pane.

Lock screen panes can be visible one at a time, or more than one at a time, in a display area. For example, a user can pan through different lock screen panes that are displayed one at a time in a display area, or a user can select (e.g., with a tap gesture on a touchscreen) a lock screen pane that is displayed along with other lock screen panes at the same time in a display area. Lock screen panes may not always be visible when a computing device is in a locked state.

The visual information in a lock screen pane can occupy all of a display area or only part of a display area, or a lock screen pane may be presented as an overlay (e.g., a partially transparent overlay) on top of other visual information. For example, if a collection of images is displayed on a touchscreen of a computing device in an unlocked state, and the computing device subsequently enters a locked state (e.g., when the device has been idle for a period of time), a lock screen pane can be presented as a partially transparent overlay on top of the displayed images.

Described techniques and tools can use lock screens with any number of lock screen panes in any configuration, and lock screen panes can be associated with any number of access levels.

Example 8

Exemplary Method of Applying a Combination of the Technologies

Figure 2:
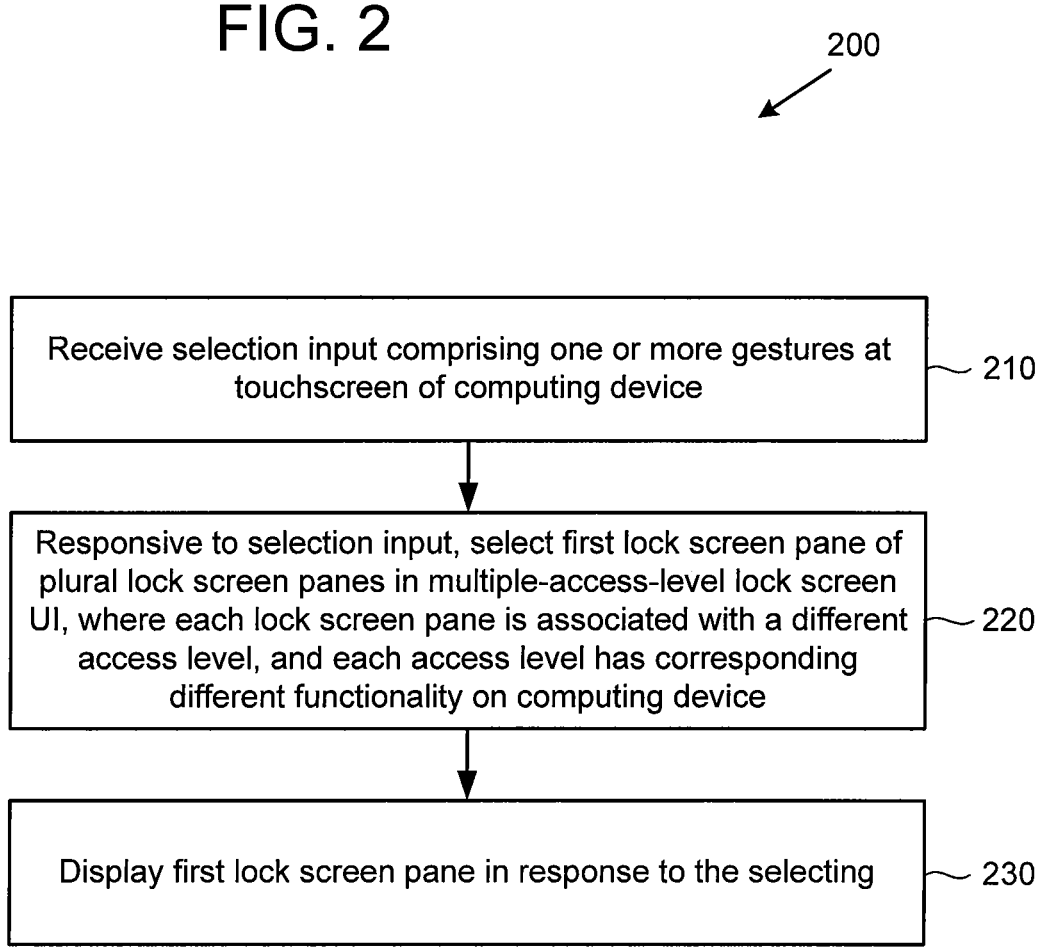
FIG. 2 is a flowchart of an exemplary method of implementing multiple-access-level lock screen technology described herein.

FIG. 2 is a flowchart of an exemplary method 200 of implementing one or more of the multiple-access-level lock screen technologies described herein and can be implemented, for example, in a system such as that shown in FIG. 1. The technologies described herein can be generic to the specifics of operating systems or hardware and can be applied in any variety of environments to take advantage of the described features.

At 210, a computing device receives selection input comprising one or more gestures at a touchscreen of the computing device. For example, a user performs a gesture on a touchscreen of a computing device in a locked state. At 220, responsive to the selection input, the computing device selects a first lock screen pane of plural lock screen panes in a multiple-access-level lock screen user interface. Each lock screen pane of the plural lock screen panes is associated with a different access level, and each access level has corresponding different functionality (e.g., access to different sets of resources) on the computing device. For example, in a lock screen having three lock screen panes, a user performs a drag or pan gesture to the left or right to bring a lock screen pane into the display area. A user also can use other gestures, such as tap gestures. For example, if several lock screen panes are displayed in a display area, a user can use a tap gesture on a part of a touchscreen occupied by a desired lock screen pane to indicate a preference for the desired lock screen pane. At 230, the computing device displays the first lock screen pane in response to the selecting. In any of the examples herein, steps such as those described above can be repeated (e.g., to select and/or display additional lock screen panes).

The method 200 and any of the methods described herein can be performed by computer-executable instructions stored in one or more computer-readable media (e.g., storage or other tangible media) or one or more computer-readable storage devices.

Example 9

Exemplary Multiple-Access-Level Lock Screen Features

Figure 3:
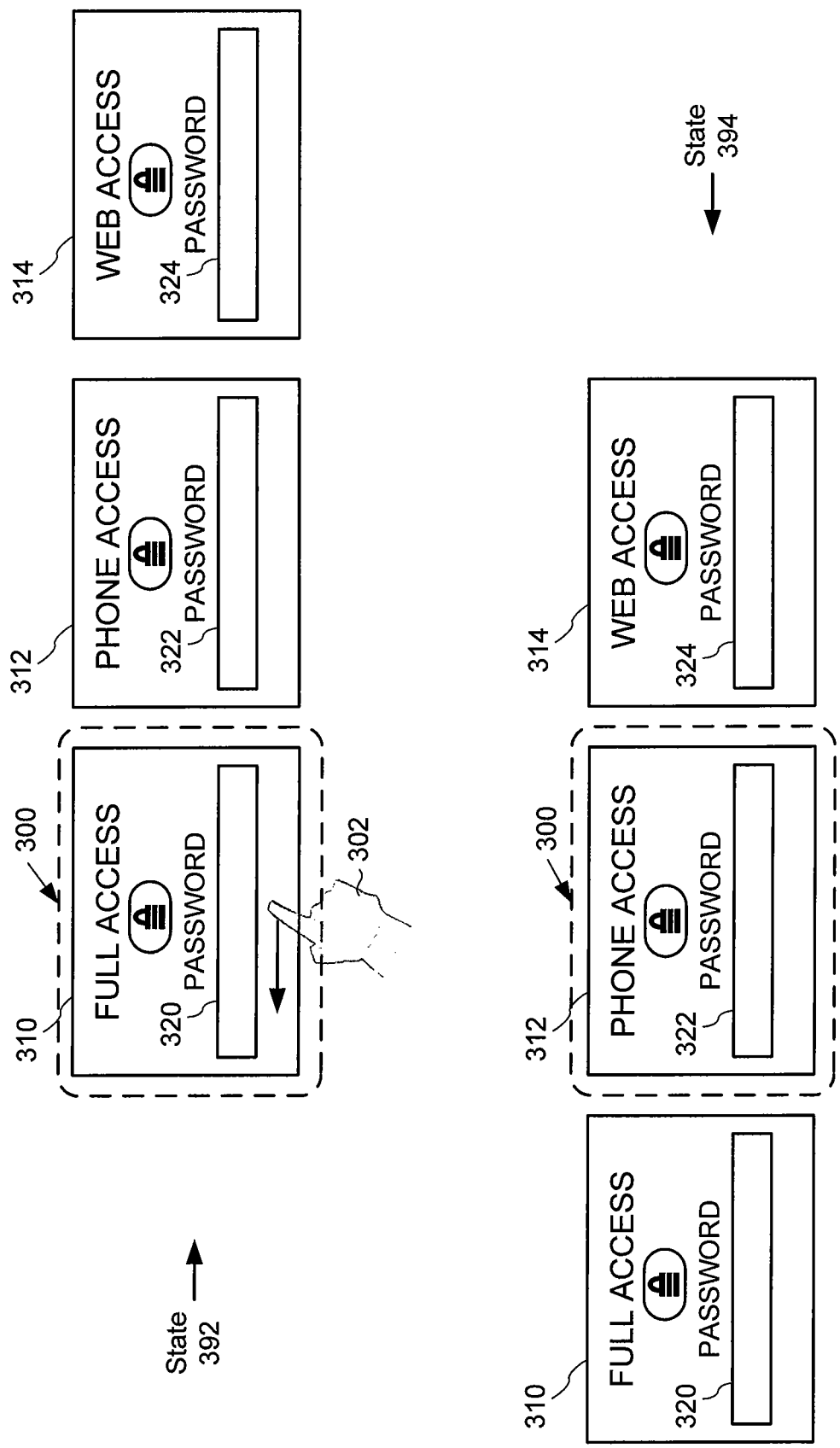
FIG. 3 is a diagram of exemplary multiple-access-level lock screen features.

FIG. 3 is a conceptual diagram of exemplary multiple-access-level lock screen features which can be implemented, for example, in a system such as that shown in FIG. 1. Any of the multiple-access-level lock screen features described herein can be implemented in computer-executable instructions stored in one or more computer-readable media (e.g., storage or other tangible media) or one or more computer-readable storage devices.

According to the example shown in FIG. 3, a multiple-access-level lock screen includes a full-access lock screen pane 310, a phone-access lock screen pane 312 and a web-access lock screen pane 314. Each of the lock screen panes 310, 312, 314 can accept user input (e.g., a password) in text boxes 320, 322, 324. Such user input can be referred to as unlock input, which is described in further detail in other examples herein. If the unlock input is accepted by the device, it can cause the device to be unlocked with respect to a set of resources corresponding to an access level associated with the respective lock screen pane. The lock screen panes 310, 312, 314 can accept the same input (e.g., the same password) or can require different input (e.g., different passwords). The particular expected unlock input for the lock screen panes can be adjusted based on user preferences.

According to the example shown in FIG. 3, the lock icon in lock screen panes 310, 312, 314 provides an indication of a locked state. In addition, text in the lock screen panes (e.g., "FULL ACCESS," "PHONE ACCESS," and "WEB ACCESS" in lock screen panes 310, 312, and 314, respectively) provides an indication of the type of access and access level associated with each lock screen pane. A user can select a desired access level by navigating between the respective lock screen panes.

In state 392, the full-access lock screen pane 310 is shown in a display area 300 of a touchscreen. A user 302 performs a leftward gesture on the touchscreen, as indicated by the leftward-pointing arrow. State 394 shows that phone-access lock screen pane 312 has been selected in response to the gesture. In state 394, the phone-access lock screen pane 312 is shown in the display area 300. Other gestures can be used to navigate between the lock panes in other ways. For example, an additional leftward gesture from state 394 can cause lock screen pane 314 to be selected. As another example, a rightward gesture from state 394 can cause lock screen pane 312 to be selected again, as shown in state 392.

Example 10

Exemplary Transition Between Lock Screen Panes

The transitions between lock screen panes can be presented in different ways. For example, a multiple-access-level lock screen tool can animate a transition from one lock screen pane to another with a scrolling motion that ends when the selected lock screen pane is brought fully into view in a display area. Or, a multiple-access-level lock screen tool can jump directly to a selected lock screen pane without scrolling during the transition. Such a jump can be combined with blending effects, fade-in/fade-out effects, or the like, for a smoother visual transition.

In any of the examples herein, transitions between screens can be adjustable to suit user preferences, device characteristics (e.g., display characteristics), and the like.

Example 11

Exemplary State Diagram for Multiple-Access-Level Lock Screen

Figure 4:
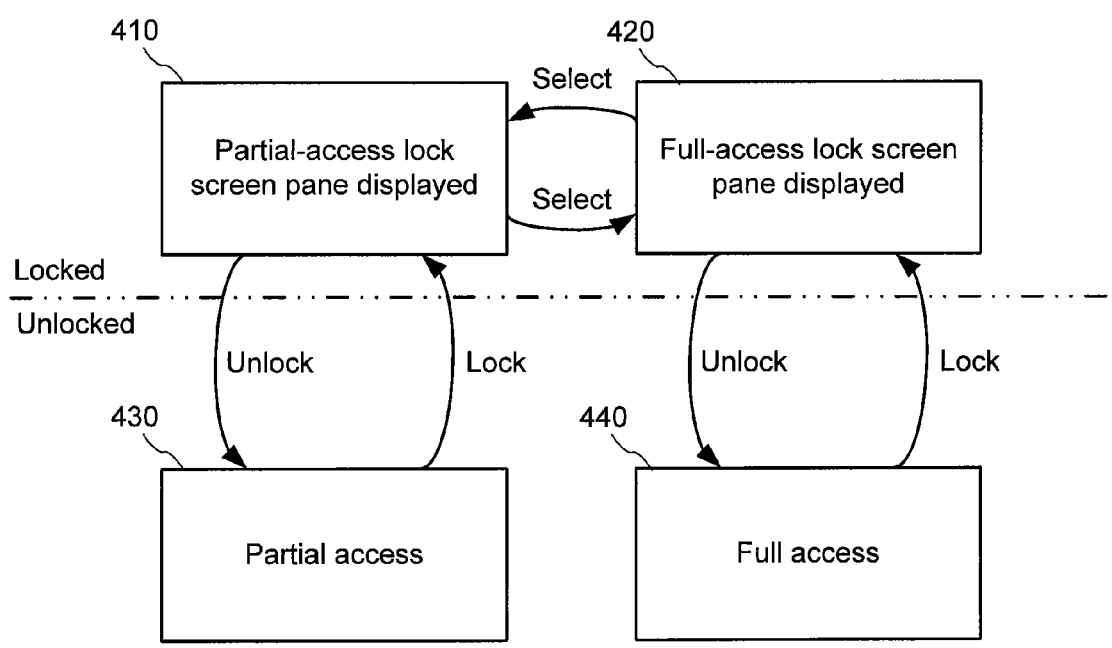
FIG. 4 is a state diagram for an exemplary multiple-access-level lock screen.

FIG. 4 is an exemplary state diagram for an exemplary multiple-access-level lock screen which can be implemented, for example, in a system such as that shown in FIG. 1.

According to the example shown in FIG. 4, a computing device in a locked state can be in a locked state 410 in which a partial-access lock screen pane is displayed, or a locked state 420 in which a full-access lock screen pane is displayed. The device can switch between the lock screen states depending on, for example, user input or events that cause a lock screen pane to be selected. From locked state 410, if the computing device is unlocked (e.g., in response to a user's entry of a correct password at the partial-access lock screen pane), the computing device enters a partial-access unlocked state 430, in which the computing device is unlocked but only allows access to a subset of resources on the computing device. From locked state 420, if the computing device is unlocked (e.g., in response to a user's entry of a correct password at the full-access lock screen pane), the computing device enters a full-access unlocked state 440, in which the computing device is unlocked but and allows access to a full set of resources (i.e., more resources than the subset of resources in partial-access unlocked state 430).

In practice, a computing device implementing a multiple-access-level lock screen can exist in many more states, or different states, than the exemplary states shown in FIG. 4. For example, a multiple-access-level lock screen with more than two lock screen panes can have more than two locked states and more than two unlocked states. As another example, a computing device can have intermediate states, such as states in which unlock input (e.g., a password) is being processed to determine (e.g., based on a comparison of a password with an expected unlock input) whether to enter an unlocked state.

Example 12

Exemplary Unlock Input

In any of the examples described herein, unlock input can be, for example, password input (e.g., a PIN or other password), gesture input (e.g., a gesture that follows a particular pattern), audio input (e.g., voice input), biometric input (e.g., fingerprint input) or any other type of input. Typically, unlock input is received when a device is in a locked state. Unlock input can be distinguished from other types of input. For example, in a multiple-access-level lock screen user interface, some types of gesture input (e.g., leftward or rightward pan or drag gestures) can be interpreted as selection input for selecting lock screen panes, while other types of gesture input (e.g., gesture input that follows a particular pattern to cause a device to enter an unlocked state) can be interpreted as unlock input. Typically, received unlock input is compared with a value that represents an expected unlock input (e.g., a password, a gesture pattern, etc.) for unlocking the device (e.g., at an access level that corresponds to a selected lock screen pane): if the received unlock input matches the expected unlock input, the device is unlocked, and if the received unlock input does not match the expected unlock input, the device remains locked. Expected unlock input for a particular lock screen pane can be set by default or can be defined or adjusted according to user settings. For example, a user can adjust settings to allow one or more lock screen panes to receive gesture input, password input, or some other type of unlock input. A user also can set or update expected passwords, expected gesture patterns, etc. Received unlock input can be translated or converted to other values to assist in authentication. For example, if a lock screen pane accepts gesture input, the received gesture input can be translated into a digital data signature which can be used to authenticate the user.

Input can be considered unlock input even if it fails to actually unlock a device. For example, an incorrect password still can be considered unlock input, even if it fails to unlock the device. Unlock input that fails to unlock a device can be referred as unsuccessful unlock input, and unlock input that succeeds in unlocking a device can be referred to as successful unlock input.

Example 13

Exemplary Method of Applying a Combination of the Technologies

Figure 5:
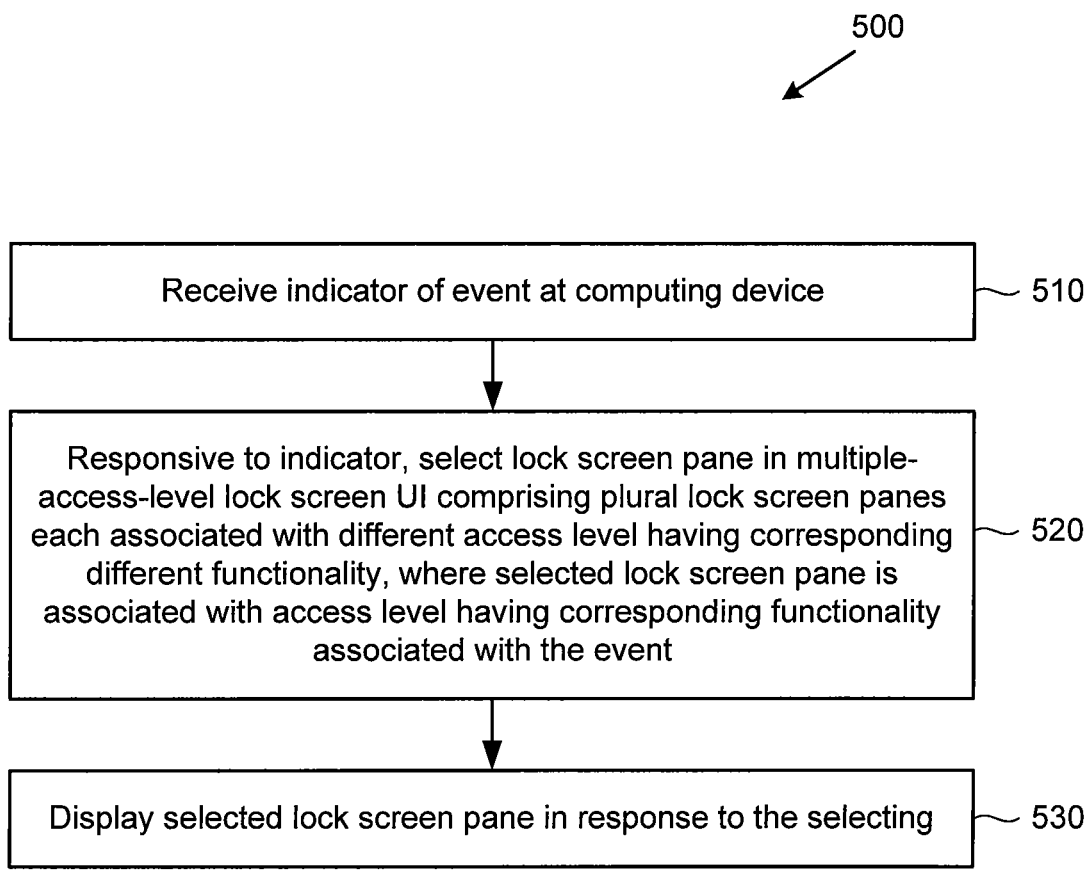
FIG. 5 is a flowchart of another exemplary method of implementing multiple-access-level lock screen technology described herein.

FIG. 5 is a flowchart of an exemplary method 500 of implementing multiple-access-level lock screen technology described herein and can be implemented, for example, in a system such as that shown in FIG. 1.

At 510, the system receives an indicator of an event at a computing device. For example, the system can receive an indicator of a new text message or some other event, such as a phone call. At 520, in response to the indicator, the system selects a lock screen pane in a multiple-access-level lock screen user interface comprising plural lock screen panes each associated with a different access level having corresponding different functionality. Such a lock screen pane can be referred to as an event-triggered lock screen pane. The selected lock screen pane is associated with an access level having corresponding functionality associated with the event. For example, the selected lock screen pane can be associated with an access level having functionality restricted to messaging-related functionality (e.g., restricted to use of a particular application, such as a messaging application) where the event is a new text message or some other messaging-related event. Messaging-related functionality can include, for example, composing a new message, reading messages, looking up a contact in a contact list, etc. As another example, the selected lock screen pane can be associated with an access level having functionality restricted to phone-related functionality where the event is a missed phone call or some other phone-related event. Phone-related functionality can include, for example, making a phone call, looking up a contact in a contact list, etc. At 530, the system displays the selected lock screen pane in response to the selection.

Example 14

Exemplary Event-Triggered Lock Screen Pane

In any of the examples herein, a lock screen pane can be selected in response to an event. Such a lock screen pane can be referred to as an event-triggered lock screen pane. As with other lock screen panes, event-triggered lock screen panes can be associated with an access level. An event-triggered lock screen pane can be set by default or defined or adjusted based on, for example, user settings. For example, a user can define an event-triggered lock screen pane with an access level that allows access to only a messaging application for messaging events. User-defined lock screen panes and access levels can allow users to quickly access any set of resources.

As with other lock screen panes, event-triggered lock screen panes can accept any kind of unlock input (e.g., depending on implementation and/or user settings) to cause a computing device to enter an unlocked state. For example, an event-triggered lock screen pane can receive gesture input (e.g., one or more gestures that follow a particular pattern) and compare the received gesture input with expected gesture input to authenticate a user, or an event-triggered lock screen pane can accept password or PIN input and compare the received input with an expected password or PIN input to authenticate a user. Gesture input can be useful for event-triggered lock screen panes to allow quicker access to functionality than other types of unlock input, such as password input. The expected unlock input can be adjustable based on, for example, user settings.

Figure 6:
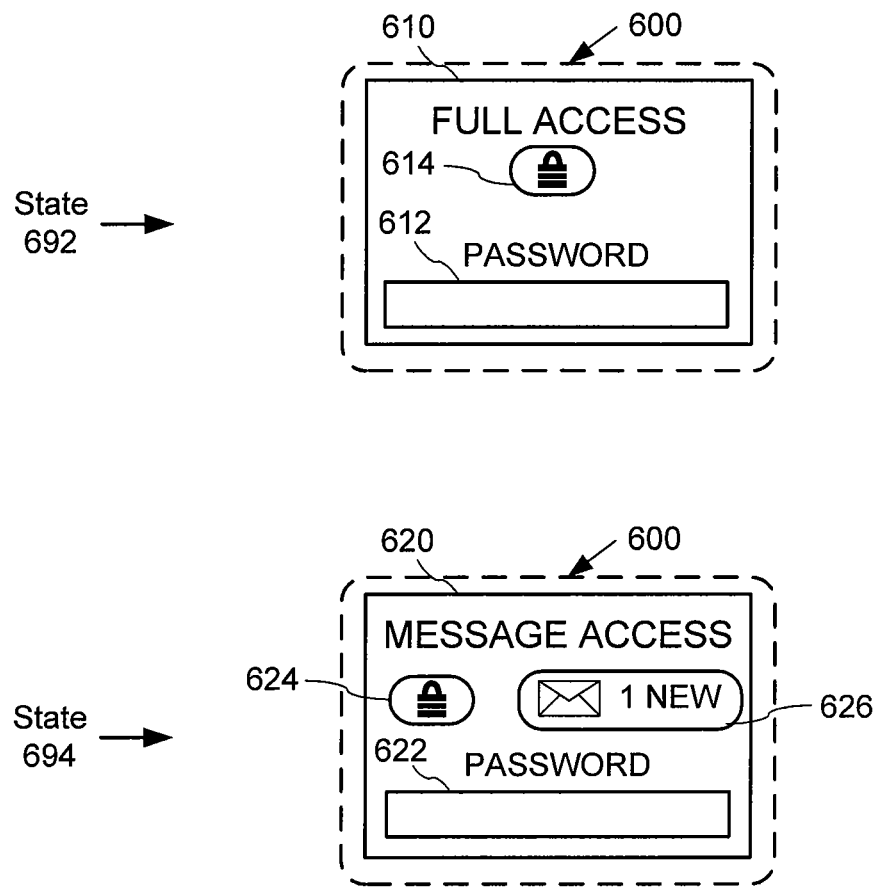
FIG. 6 is a diagram of exemplary multiple-access-level lock screen features.

FIG. 6 is a conceptual diagram showing selected lock screen panes in a multiple-access-level lock screen user interface for a computing device. In state 692, lock screen pane 610 has been selected and is shown in display area 600. Lock screen pane 610 is associated with full access to the computing device, as indicated by text in the lock screen pane ("FULL ACCESS"). In state 694, lock screen pane 620 has been selected and is shown in display area 600. Lock screen pane 620 has been selected in response to a messaging event. Lock screen pane 620 is associated with access to only messaging functionality on the computing device, as indicated by text in the lock screen pane ("MESSAGING ACCESS"). Lock screen panes 610 and 620 also each include a graphical lock icon 614, 624, which indicates that the device is in a locked state, and a text box 612, 622 for entering password input. Lock screen pane 620 also includes an element 626 that indicates the event that triggered the lock screen pane. In this example, the event that triggered lock screen pane 620 is a new text message, as indicated by the envelope icon and the text "1 NEW" in the element 626.

The event-triggered lock screen panes described herein are only examples. Any number of event-triggered lock screen panes can be used, and such panes can accept any type of input.

Example 15

Exemplary Method of Applying a Combination of the Technologies

Figure 7:
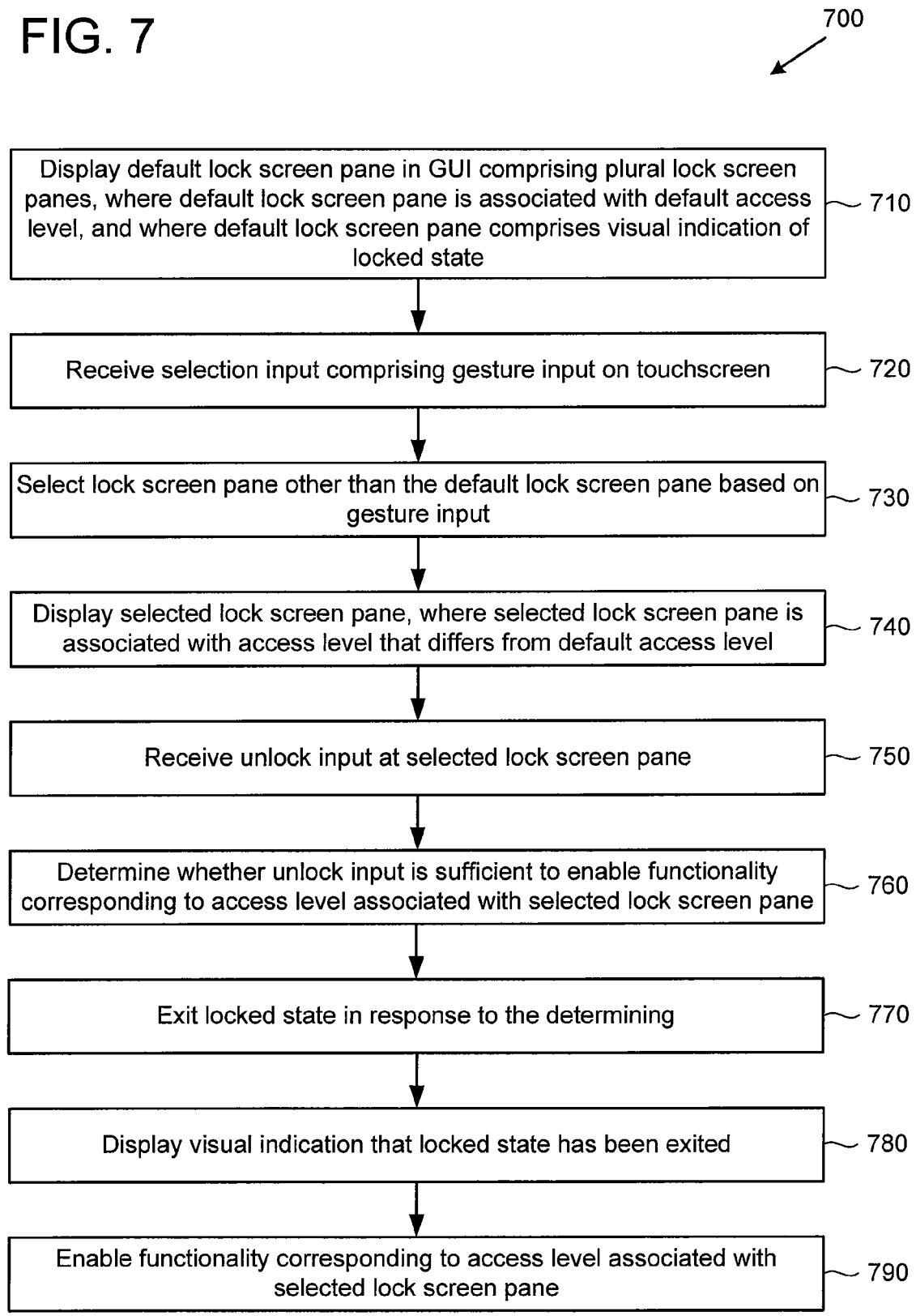
FIG. 7 is a flowchart of another exemplary method of implementing multiple-access-level lock screen technology described herein.

FIG. 7 is a flowchart of another exemplary method 700 of implementing multiple-access-level lock screen technology described herein and can be implemented, for example, by a system such as that shown in FIG. 1.

At 710, the system displays (e.g., on a touchscreen having a display area) a default lock screen pane in a graphical user interface comprising plural lock screen panes. The default lock screen pane is associated with a default access level and includes a visual indication of a locked state. For example, the default lock screen pane can be a full-access lock screen pane associated with an access level that provides full access to a computing device. As another example, the default lock screen pane can be a partial-access lock screen pane associated with an access level that provides partial access (e.g., access to a particular application or other resource) to a computing device. The visual indication of the locked state can include a graphic (e.g., a lock icon), text, or some other visual indication of a locked state.

At 720, the system receives selection input comprising gesture input on a touchscreen. For example, the gesture input can comprise pan or drag gestures (e.g., leftward or rightward pan or drag gestures). Alternatively, the gesture input can comprise tap gestures, multi-touch gestures, or other gesture input.

At 730, the system selects a lock screen pane other than the default lock screen pane based on the selection input. For example, the system can select a lock screen pane based on a direction of the gesture input, such as by moving a selected lock screen pane to the left and into view in the display area when the gesture input comprises a leftward gesture, or by moving a selected lock screen pane to the right and into view in the display area when the gesture input comprises a rightward gesture, or by moving a selected lock screen pane up or down when the gesture comprises an upward or downward gesture. As another example, the system can select a lock screen pane based on other characteristics of the gesture input, such as velocity or position (e.g., the screen coordinates of a tap gesture on the touchscreen).

At 740, the system displays the selected lock screen pane. The selected lock screen pane is associated with an access level that differs from the default access level. For example, the selected lock screen pane can be associated with an access level that corresponds to access to an individual application, such as a web browser or other application, where the default access level provides access to all applications on a computing device. As another example, the selected lock screen pane can be associated with an access level that corresponds to access to all applications on a computing device where the default access level provides access to only an individual application, such as a web browser or other application.

At 750, the system receives unlock input at the selected lock screen pane. For example, the system can receive password or PIN input at a text box in the selected lock screen pane, which can be used to authenticate a user. As another example, the system can receive gesture input which can be used to authenticate a user. Or, other unlock input can be used.

At 760, the system determines whether the unlock input is sufficient to enable functionality corresponding to the access level associated with the selected lock screen pane. Typically, this determination involves comparing the received unlock input with an expected unlock input. For example, if the expected unlock input is a gesture that follows a particular pattern, the system can translate received gesture input to a digital signature and compare it with a digital signature that corresponds to an expected gesture. As another example, if the expected unlock input is a password, the system can compare a received password with an expected password.

At 770, the system exits the locked state in response to the determining step. For example, where received unlock input matches expected unlock input, the system exits the locked state and enters an unlocked state (e.g., an unlocked state where a user can access the computing device at an access level that corresponds to the selected lock screen pane). At 780, the system displays a visual indication that that the locked state has been exited. For example, a graphical lock icon that was present in the lock screen pane can be caused to disappear from the display area as an indication that the locked state has been exited, or some other visual indication can be used. At 790, the system enables functionality corresponding to the access level associated with the selected lock screen pane. For example, the system can enter an unlocked state with respect to an individual application, such as a web browser or other application, while other functionality remains locked, or the system can enable other types or levels of functionality.

Example 16

Exemplary System Employing a Combination of the Technologies

Figure 8:
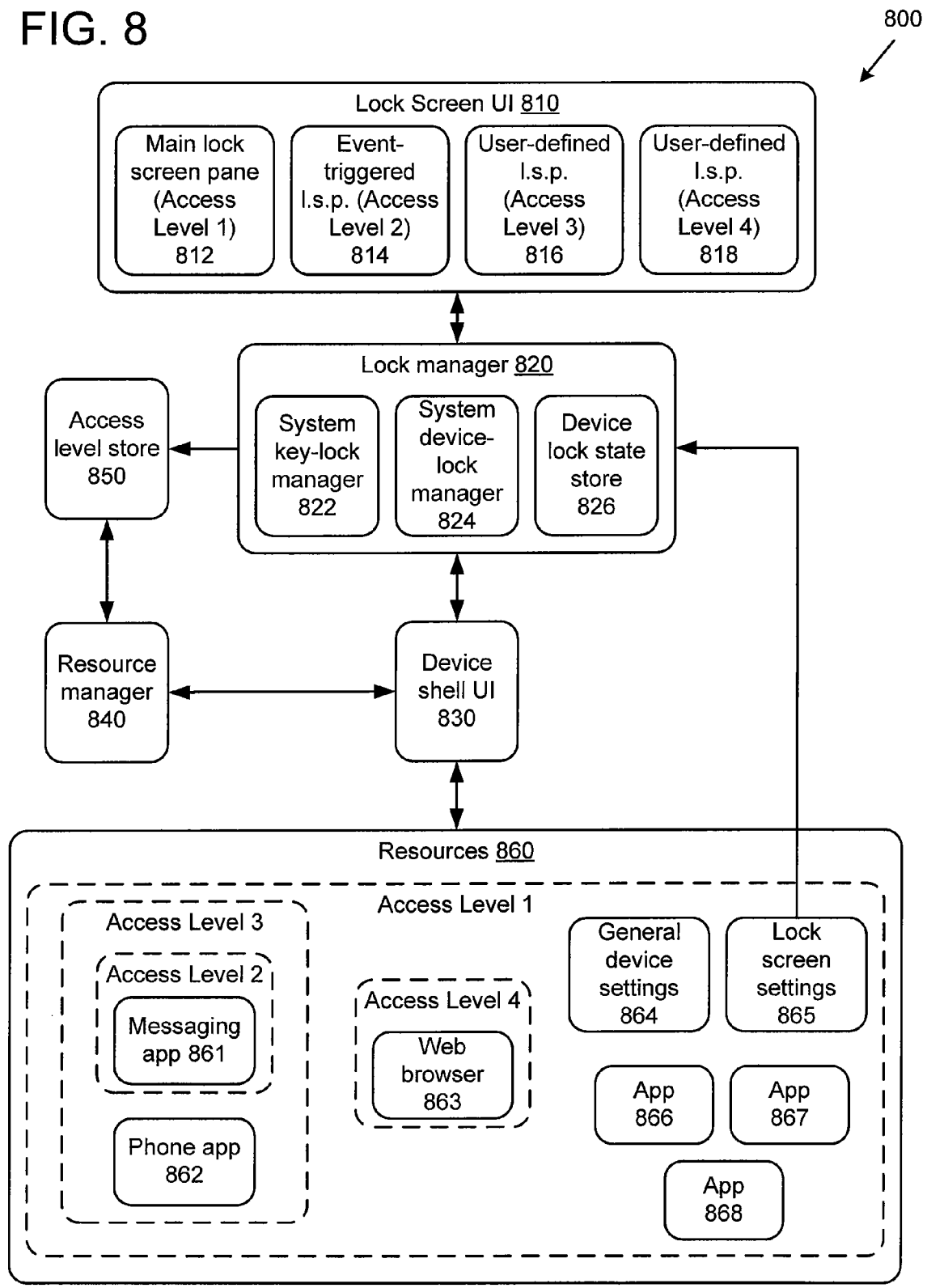
FIG. 8 is a block diagram of another exemplary system implementing multiple-access-level lock screen technology described herein.

FIG. 8 is a block diagram of another exemplary system 800 implementing multiple-access-level lock screen technology described herein. One or more computing devices can implement the system 800.

In the example, a multiple-access-level lock screen UI 810 comprises four lock screen panes. The UI can operate in a secure layer while a computing device is in a key-locked or device-locked state. Lock screen pane 812 is labeled as the main lock screen pane, and acts as a default lock screen pane associated with an access level that provides full access to the functionality of the computing device. For example, when a computing device first enters a locked state, the lock screen pane 812 can be displayed. Lock screen pane 814 is an event-triggered lock screen pane. For example, when an event associated with the lock screen pane 814 occurs, the lock screen pane 814 can be selected and displayed. Lock screen panes 816, 818 are user-defined lock screen panes. For example, a user can adjust settings to define a lock screen pane and an access level associated with the lock screen pane. Such access levels can be defined by user-defined access level classes. Such classes can include definitions of, for example, a subset of device applications or other resources that are accessible at the respective access level, expected unlock input (e.g., passwords, codes, etc.), and/or other information, such as a label for the corresponding lock screen pane. Once defined, user defined lock screen panes can be added to the lock screen UI 810. Alternatively, the system 800 can have more or fewer lock screen panes, or different lock screen panes.

A lock manager 820 comprises a system key-lock manager 822, a system device-lock manager 824 and a device lock state store 826. The system key-lock manager 822 manages key lock actions, such as locking or unlocking the keys of a computing device. In a key-lock state, a device can require a particular input to unlock keys of the device prior to receiving other input from the keys. Such input can be required prior to, for example, receiving key-based input to select a lock screen pane, unlock a device with respect to particular access levels, etc. A device lock manager for a device with a touchscreen also can have a screen-lock manager. In a screen-lock state, a device can require a particular input to unlock a touchscreen of the device prior to receiving other input from the touchscreen. Such input can be required prior to, for example, receiving gesture input to select a lock screen pane, unlock a device with respect to particular access levels, etc.

Device-lock manager 824 can manage device lock actions. For example, device-lock manager 824 can interact with device lock state store 826 to select lock screen panes (e.g., lock screen panes 812, 814, 816, 818), to determine whether a password or other unlock input is sufficient to unlock the device, or when performing other device lock actions. Device lock state store 826 can include definitions of user-defined access levels and lock screen panes, default access levels and lock screen panes, event-triggered access levels and lock screen panes, expected unlock input, and/or other information. Device-lock manager 824 also can use other information to manage device lock actions. For example, device-lock manager 824 can analyze user input (e.g., gesture input) and event information (e.g., indicators of new messages or other events) in selecting lock screen panes. As another example, device-lock manager 824 can analyze information such as historical use data from one or more users in selecting lock screen panes. For example, if a user has used gesture input to select the same lock screen pane with great frequency, device-lock manager 824 can set that lock screen pane as the default lock screen pane. Alternatively, device-lock manager 824 can be omitted and device lock actions such as lock screen pane selection can be handled elsewhere (e.g., in device shell UI 830).

Device-lock manager 824 can store current access level information in access level store 850 to reflect the corresponding access level. For example, when the device is unlocked via a selected lock screen pane, the access level information in access level store 850 can be updated to reflect the access level that corresponds to the selected lock screen pane. The access level information also can be updated when the device enters a locked state from an unlocked state, or when the device enters a different unlocked state with a different access level. Resource manager 840 can use access level information in access level store 850 to determine which resources (e.g., applications) can be accessed. A list of resources that can be accessed at a particular access level can be referred to as a "white list" of resources. Resource manager 840 also can communicate with device shell UI 830. For example, if access level information in access level store 850 indicates that only a messaging application can be used at the current access level, resource manager 840 can communicate with device shell UI 830 to cause the messaging application to be launched and to specify that only the messaging application should be exposed to a user through the device shell UI 830. As another example, if access level information in access level store 850 indicates that several resources can be used at the current access level, resource manager 840 can communicate with device shell UI 830 to cause the usable resources to be listed while leaving hidden other resources that cannot be used.

In the example, four groups of resources 860 are shown. The resources 860 include messaging application 861, phone application 862, web browser application 863, general device settings 864, lock screen settings 865, and other applications 866, 867, 868. The group labeled "Access Level 1" corresponds to lock screen pane 812 and includes all of the resources 860. Access Level 1 includes several resources that are not available at any of the other access levels shown in this example, such as general device settings 864 and lock screen settings 865.

When the device is unlocked at Access Level 1, a user can adjust lock screen settings 865 to create or edit lock screen panes, create or edit access levels and their corresponding resources, and other settings relating to multiple-access-level lock screen UI 810. Lock screen settings 865 can be used, for example, to update information in device lock state store 826 or access level store 850.

The group labeled "Access Level 2" corresponds to event-triggered lock screen pane 814 and includes only messaging application 861. Although not labeled as a user-defined lock screen pane, the characteristics of event-triggered lock screen pane 814 and its corresponding access level can be adjusted according to user settings. The group labeled "Access Level 3" corresponds to user-defined lock screen pane 816 and includes messaging application 861 and phone application 862. The group labeled "Access Level 4" corresponds to user-defined lock screen pane 818 and includes only web browser application 863. These groups of resources are only examples. In practice, any number of groups can be used, in any arrangement.

Example 17

Exemplary User Interface for Parameter Control

Figure 9:
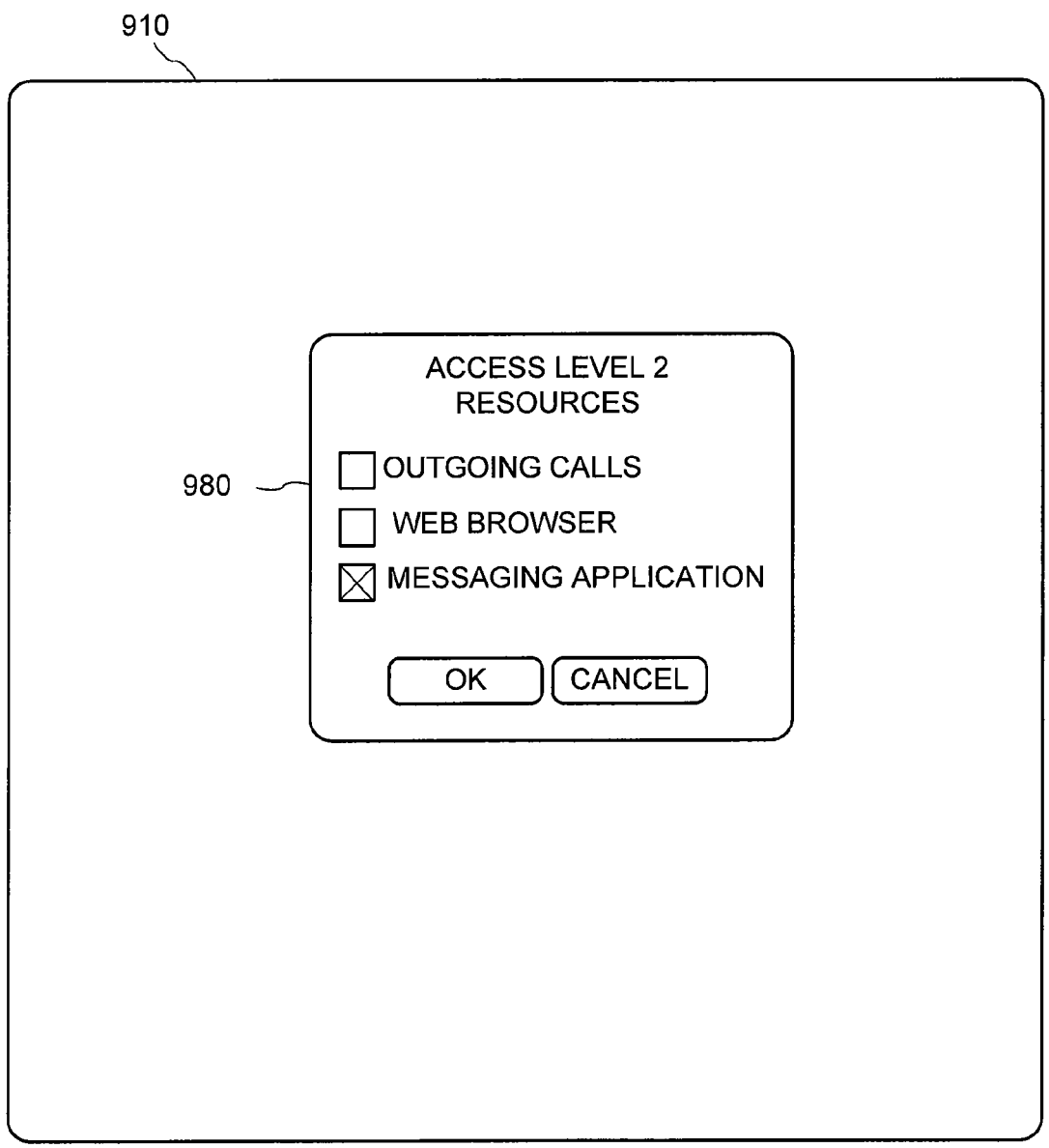
FIG. 9 is a diagram of an exemplary user interface accepting additional information for control of one or more multiple-access-level lock screen features.

FIG. 9 is a diagram of an exemplary user interface 910 accepting input of lock screen settings and/or other parameters related to multiple-access-level lock screen technology described herein. User interface 910 includes a selection area 980 in which a user can select resources to be associated with access levels. In the example, a user has selected "MESSAGING APPLICATION" as a resource for an access level ("ACCESS LEVEL 2") in a selection area 980, while other resources ("OUTGOING CALLS" and "WEB BROWSER") are left unselected. Additional information that can be provided by a user via user interface 910 can include definitions of new access levels or lock screen panes, expected unlock input for lock screen panes, or the like.

Example 18

Exemplary Gesture

In any of the examples herein, user input can include one or more gestures on a touchscreen. A touch-based UI system can accept input from one or more contact points on a touchscreen and use the input to determine what kind of gesture has been made. For example, a touch-based UI system can distinguish between different gestures on the touchscreen, such as drag gestures and flick gestures, based on gesture velocity. When a user touches the touchscreen and begins a movement while maintaining contact with the touchscreen, the touch-based UI system can continue to fire inputs while the user maintains contact with the touchscreen and continues moving. The position of the contact point can be updated, and the rate of movement (velocity) can be monitored. When the physical movement ends (e.g., when user breaks contact with the touchscreen), the system can determine whether to interpret the motion as a flick by determining how quickly the user's finger, stylus, etc., was moving when it broke contact with the touchscreen, and whether the rate of movement exceeds a threshold. The threshold velocity for a flick to be detected (i.e., to distinguish a flick gesture from a drag gesture) can vary depending on implementation.

In the case of a drag gesture, the system can move content in the amount of the drag (e.g., to give an impression of the content being moved directly by a user's finger). In the case of a flick gesture (e.g., where the user was moving more rapidly when the user broke contact with the touchscreen), the system can use simulated inertia to determine a post-gesture position for the content, allowing the content to continue to move after the gesture has ended. Although gestures such as drag and flick gestures are commonly used to cause movement of content in a display area, such gestures also can be accepted as input for other purposes without causing any direct movement of content. For example, gestures can be used to unlock functionality in a multiple access level lock screen system.

A touch-based UI system also can detect a tap or touch gesture, such as where the user touches the touchscreen in a particular location, but does not move the finger, stylus, etc. before breaking contact with the touchscreen. As an alternative, some movement is permitted, within a small threshold, before breaking contact with the touchscreen in a tap or touch gesture. A touch-based system also can detect multi-touch gestures made with multiple contact points on the touchscreen.

Depending on implementation and/or user preferences, gesture direction can be interpreted in different ways. For example, a device can interpret any movement to the left or right, even diagonal movements extending well above or below the horizontal plane, as a valid leftward or rightward motion, or the system can require more precise movements. As another example, a device can interpret any upward or downward movement, even diagonal movements extending well to the right or left of the vertical plane, as a valid upward or downward motion, or the system can require more precise movements. As another example, upward/downward motion can be combined with left/right motion for diagonal movement effects. Multi-dimensional gestures (e.g., gestures involving a combination of movement in more than one dimension, such as horizontal motion followed by vertical motion) also can be used.

The actual amount and direction of the user's motion that is necessary for a device to recognize the motion as a particular gesture can vary depending on implementation or user preferences. For example, a user can adjust a touchscreen sensitivity control, such that differently sized or shaped motions of a fingertip or stylus on a touchscreen will be interpreted as the same gesture to produce the same effect, or as different gestures to produce different effects, depending on the setting of the control.

The gestures described herein are only examples. In practice, any number of the gestures described herein or other gestures can be used when implementing the technologies described herein. Described techniques and tools can accommodate gestures of any size, velocity, or direction, with any number of contact points on the touchscreen.

Example 19

Exemplary Display Area

In any of the examples herein, visual information can be rendered for display in a display area. A display area can be any area of a device that is configured to display visual information. Display areas can include, for example, display areas of touchscreens, which combine input and output functionality, or display areas of displays that are used for output only, such as desktop computer or laptop computer displays without touch input functionality. Described techniques and tools can be used with display areas of any size, shape or configuration.

Example 20

Exemplary Touchscreen

In any of the examples herein, a touchscreen can be used for user input. Touchscreens can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens. The act of contacting (or, where physical contact is not necessary, coming into close enough proximity to the touchscreen) a touchscreen in some way to generate user input can be referred to as a gesture. Described techniques and tools can be used with touchscreens of any size, shape or configuration.

Example 21

Exemplary User Input

In any of the examples herein, a user can interact with a device via different kinds of user input. For example, a user can provide user input by interacting with a touchscreen. Alternatively, or in combination with touchscreen input, a user can provide user input in some other way, such as by pressing buttons (e.g., directional buttons) on a keypad or keyboard, moving a trackball, pointing and clicking with a mouse, making a voice command, etc. The technologies described herein can be implemented to work with any such user input.

Example 22

Exemplary Computing Environment

Figure 10:
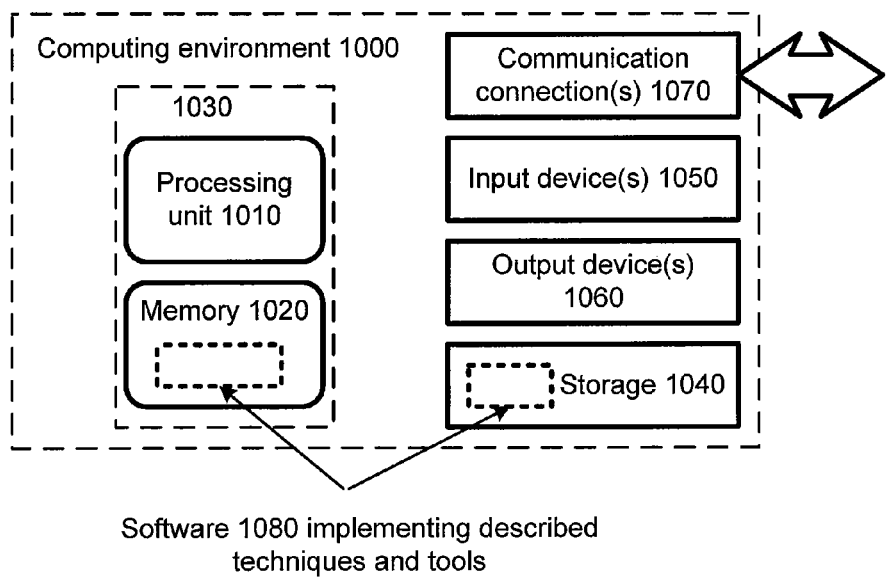
FIG. 10 is a block diagram of an exemplary computing environment suitable for implementing any of the technologies described herein.

FIG. 10 illustrates a generalized example of a suitable computing environment 1000 in which the described technologies can be implemented. The computing environment 1000 is not intended to suggest any limitation as to scope of use or functionality, as the technologies may be implemented in diverse general-purpose or special-purpose computing environments.

With reference to FIG. 10, the computing environment 1000 includes at least one processing unit 1010 coupled to memory 1020. In FIG. 10, this basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. The memory 1020 can store software 1080 implementing any of the technologies described herein.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other computer-readable media which can be used to store information and which can be accessed within the computing environment 1000. The storage 1040 can store software 1080 containing instructions for any of the technologies described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD- or DVD-writer, or another device that provides output from the computing environment 1000. Some input/output devices, such as a touchscreen, may include both input and output functionality.

The communication connection(s) 1070 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Example 23

Exemplary Implementation Environment

Figure 11:
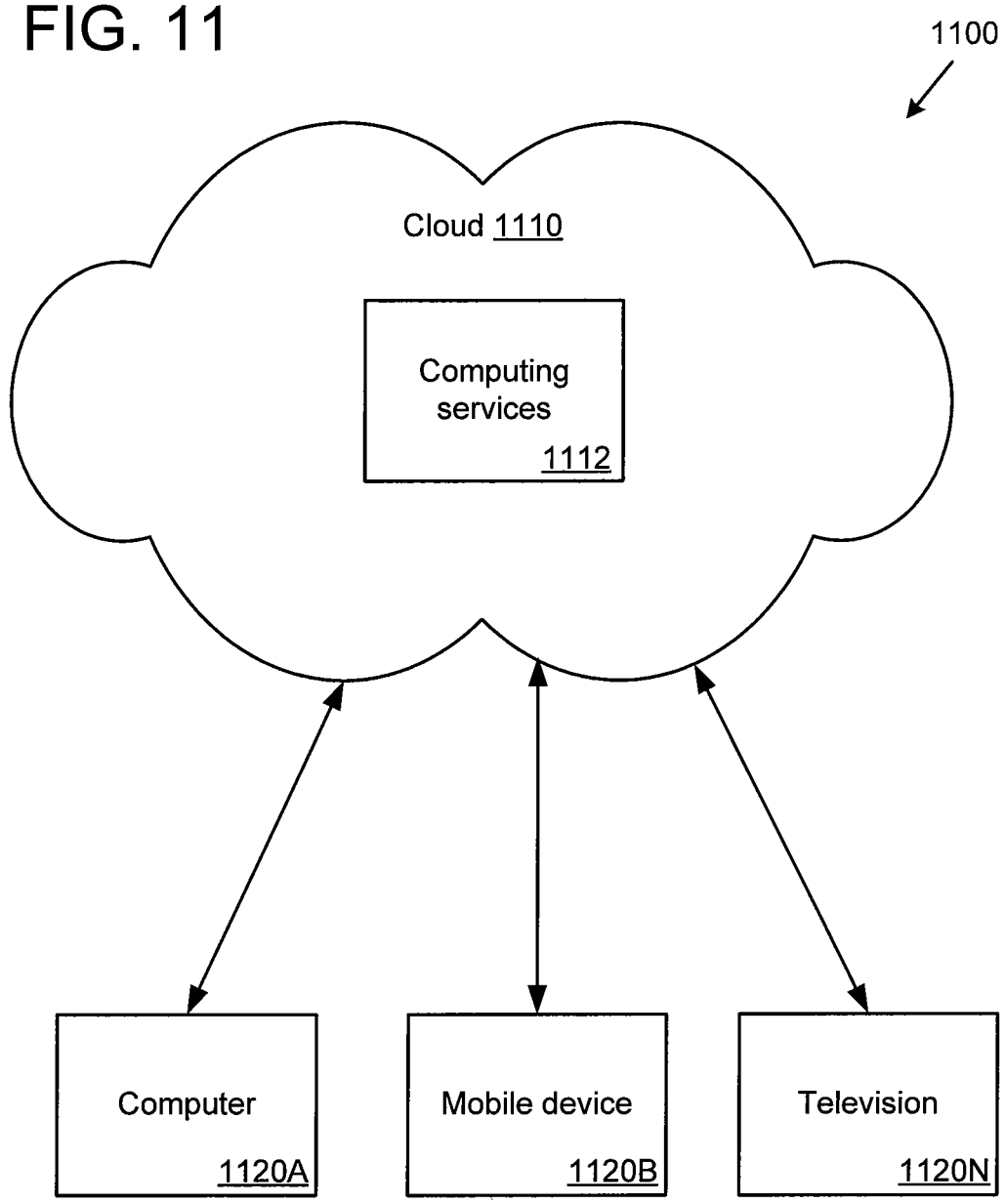
FIG. 11 is a block diagram of an exemplary cloud computing arrangement suitable for implementing any of the technologies described herein.

FIG. 11 illustrates a generalized example of a suitable implementation environment 1100 in which described embodiments, techniques, and technologies may be implemented.

In example environment 1100, various types of services (e.g., computing services 1112) are provided by a cloud 1110. For example, the cloud 1110 can comprise a collection of computing devices, which may be located centrally or distributed, that provide cloud-based services to various types of users and devices connected via a network such as the Internet. The cloud computing environment 1100 can be used in different ways to accomplish computing tasks. For example, with reference to described techniques and tools, some tasks, such as processing user input and presenting a user interface, can be performed on a local computing device, while other tasks, such as storage of data to be used in subsequent processing, can be performed elsewhere in the cloud.

In example environment 1100, the cloud 1110 provides services for connected devices with a variety of screen capabilities 1120A-N. Connected device 1120A represents a device with a mid-sized screen. For example, connected device 1120A could be a personal computer such as desktop computer, laptop, notebook, netbook, or the like. Connected device 1120B represents a device with a small-sized screen. For example, connected device 1120B could be a mobile phone, smart phone, personal digital assistant, tablet computer, and the like. Connected device 1120N represents a device with a large screen. For example, connected device 1120N could be a television (e.g., a smart television) or another device connected to a television or projector screen (e.g., a set-top box or gaming console).

A variety of services can be provided by the cloud 1110 through one or more service providers (not shown). For example, the cloud 1110 can provide services related to mobile computing to one or more of the various connected devices 1120A-N. Cloud services can be customized to the screen size, display capability, or other functionality of the particular connected device (e.g., connected devices 1120A-N). For example, cloud services can be customized for mobile devices by taking into account the screen size, input devices, and communication bandwidth limitations typically associated with mobile devices.

Example 24

Exemplary Mobile Device

Figure 12:
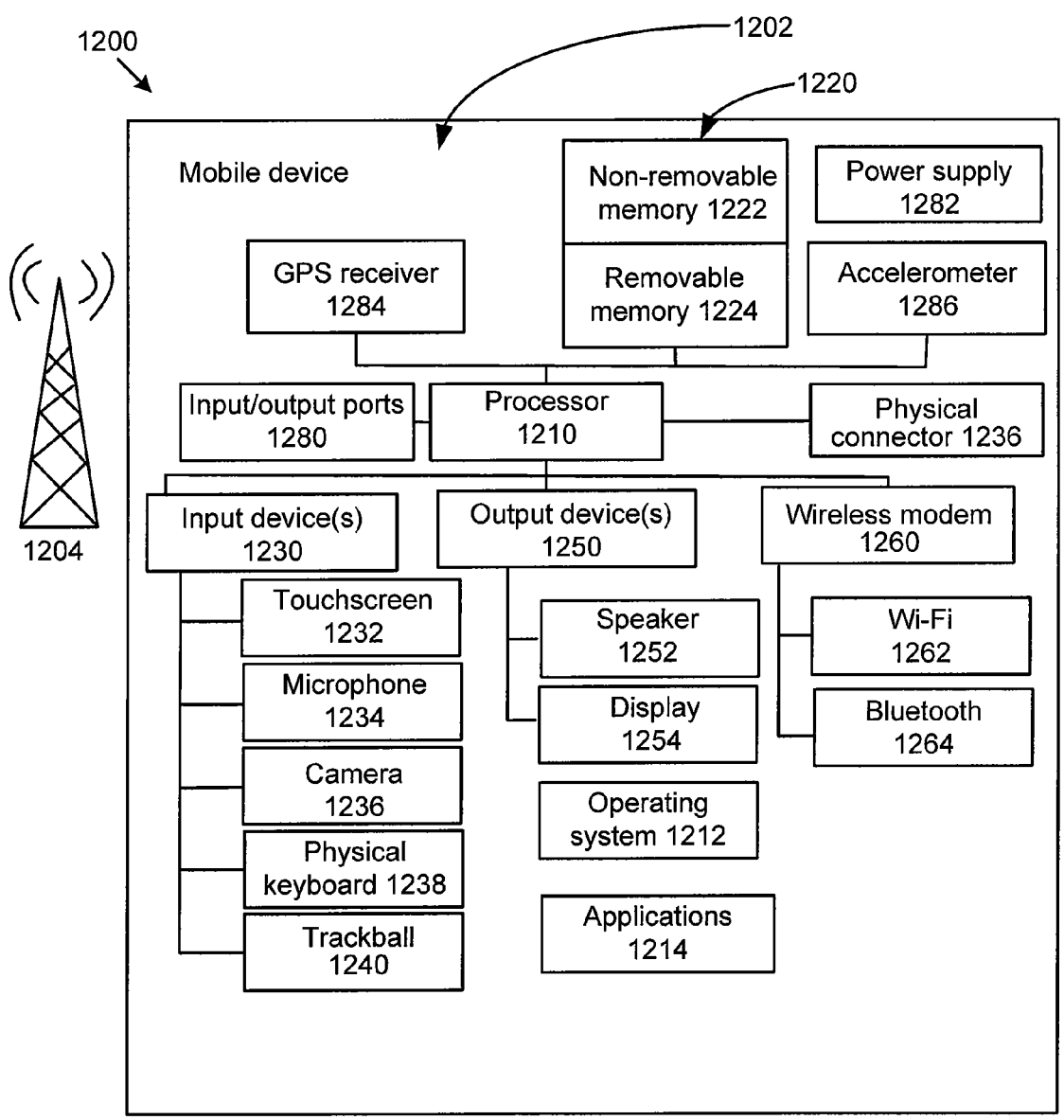
FIG. 12 is a block diagram of an exemplary mobile device suitable for implementing any of the technologies described herein.

FIG. 12 is a system diagram depicting an exemplary mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks 1204, such as a cellular or satellite network.

The illustrated mobile device can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs can include common mobile computing applications (e.g., include email applications, calendars, contact managers, web browsers, messaging applications), or any other computing application.

The illustrated mobile device can include memory 1220. Memory 1220 can include non-removable memory 1222 and/or removable memory 1224. The non-removable memory 1222 can include RAM, ROM, flash memory, a disk drive, or other well-known memory storage technologies. The removable memory 1224 can include flash memory or a Subscriber Identity Module (SIM) card, which is well known in GSM communication systems, or other well-known memory storage technologies, such as smart cards. The memory 1220 can be used for storing data and/or code for running the operating system 1212 and the applications 1214. Example data can include web pages, text, images, sound files, video data, or other data sets to be sent to and/or received from one or more network servers or other mobile devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1230, such as a touchscreen 1232, microphone 1234, camera 1236, physical keyboard 1238 and/or trackball 1240 and one or more output devices 1250, such as a speaker 1252 and a display 1254. Other possible output devices (not shown) can include a piezoelectric or other haptic output device. Some devices can serve more than one input/output function. For example, touchscreen 1232 and display 1254 can be combined in a single input/output device.

Touchscreen 1232 can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204, and/or other radio-based modems (e.g., Bluetooth or Wi-Fi). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a global positioning system (GPS) receiver, an accelerometer 1286, a transceiver 1288 (for wirelessly transmitting analog or digital signals) and/or a physical connector 1290, which can be a USB port, IEEE 1394 (FireWire) port, and/or RS-232 port. The illustrated components 1202 are not required or all-inclusive, as components can be deleted and other components can be added.

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, CD-ROM, CD-RW, DVD, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. One or more computer-readable memory or storage devices storing computer-executable instructions that, when executed by a computing device, perform a method, the method comprising:
   while the computing device remains in a locked state:
      presenting a first lock screen pane of plural lock screen panes in a multiple-access-level lock screen user interface, each of the plural lock screen panes configured to receive unlock input that unlocks the computing device in accordance with a different one of plural access levels, each of the plural access levels having corresponding different functionality on the computing device;
      receiving selection input; and
      responsive to the selection input, replacing the first lock screen pane with a second lock screen pane of the plural lock screen panes in the multiple-access-level lock user interface of the computing device,
   wherein the second lock screen pane comprises a visual indicator of a corresponding access level of the plural access levels.

2. The computer-readable memory or storage devices of claim 1, wherein the selection input comprises one or more horizontal gestures on a touchscreen of the computing device, and wherein the replacing the first lock screen pane with the second lock screen pane comprises moving the second lock screen pane horizontally into a display area of the touchscreen.

3. The computer-readable memory or storage devices of claim 1, wherein the method further comprises:
   receiving unlock input via the second lock screen pane; and
   determining whether the unlock input is sufficient to enable functionality on the computing device corresponding to an access level associated with the second lock screen pane.

4. The computer-readable memory or storage devices of claim 3, wherein the method further comprises, based on the determining, enabling the functionality associated with the access level associated with the second lock screen pane.

5. The computer-readable memory or storage devices of claim 3, wherein the unlock input comprises password input.

6. The computer-readable memory or storage devices of claim 3, wherein the unlock input comprises touchscreen input.

7. The computer-readable memory or storage devices of claim 1, wherein the plural access levels comprise a full access level and plural partial access levels, the partial access levels comprising a basic access level and an enhanced access level, and wherein functionality associated with the enhanced access level is greater than functionality associated with the basic access level and less than functionality associated with the full access level.

8. The computer-readable memory or storage devices of claim 7, wherein the functionality associated with the basic access level comprises phone call functionality.

9. The computer-readable memory or storage devices of claim 1, wherein at least one of the plural access levels is a user-definable access level.

10. The computer-readable memory or storage devices of claim 9, wherein the functionality associated with the user-definable access level comprises access to at least one resource selected by a user.

11. The computer-readable memory or storage devices of claim 10, wherein the at least one resource comprises an application.

12. The computer-readable memory or storage devices of claim 10, wherein the at least one resource comprises a group of applications.

13. The computer-readable memory or storage devices of claim 1, wherein when the second lock screen pane is presented, the first lock screen pane is removed from the user interface.

14. A computer-implemented method comprising:
   while a mobile computing device remains in a locked state:
      displaying on a touchscreen of the mobile computing device having a display area, a default lock screen pane in a graphical user interface comprising plural lock screen panes, wherein each of the plural lock screen panes are configured to receive unlock input, wherein the default lock screen pane is associated with a default access level, and wherein the default lock screen pane comprises a visual indication that the mobile computing device is in a locked state;
      receiving selection input comprising gesture input on the touchscreen;
      selecting a lock screen pane other than the default lock screen pane based on the selection input;
      changing the displayed lock screen pane from the default lock screen pane to the selected lock screen pane, wherein the selected lock screen pane is associated with an access level that differs from the default access level, and wherein the selected lock screen pane comprises a visual indicator of the associated access level;
      receiving unlock input at the selected lock screen pane;
      determining whether the unlock input is sufficient to enable functionality on the mobile computing device that corresponds to the access level associated with the selected lock screen pane;
   exiting the locked state in response to the determining;
   displaying a visual indication that the locked state has been exited in the display area; and enabling the functionality that corresponds to the access level associated with the selected lock screen pane.

15. A computing device comprising:
one or more processors;
a display; and
one or more computer-readable memory having stored therein computer-executable instructions that, when executed by the one or more processors, perform a method comprising:
  while the computing device remains in a locked state:
    presenting a default lock screen pane in a user interface on the display, wherein the default lock screen pane is associated with a default level of access to functionality of the computing device;
    receiving first selection input;
    responsive to the first selection input, presenting a second lock screen pane in the user interface on the display in place of the default lock screen pane, wherein the second lock screen pane is associated with a first limited level of access to functionality of the computing device, and wherein the first limited level of access provides access to less functionality than the default level;
    receiving second selection input; and
    responsive to the second selection input, presenting a third lock screen pane in the user interface on the display in place of the second lock screen pane, wherein the third lock screen pane is associated with a second limited level of access to functionality of the computing device, and wherein the second limited level of access provides access to less functionality than the default level,
  wherein at least one of the second lock screen pane or the third lock screen pane comprises a visual indicator of the respective limited level of access.

16. The computing device of claim 15, wherein the first and second limited functionality include at least one of phone call functionality, messaging functionality, or web browsing functionality.

17. The computing device of claim 15, wherein the method further comprises:
  receiving unlock input comprising one or more gestures on a touchscreen of the computing device; and
  determining whether the unlock input is sufficient to enable the second limited functionality associated with the first access level.

18. The computing device of claim 15, wherein presenting the second lock screen pane in place of the default lock screen pane comprises animating a transition between the default lock screen pane and the second lock screen pane.

19. The computing device of claim 15, wherein each of the default, second, and third lock screen panes include an indicator that represents the functionality with which the respective lock screen panes are associated.

* * * * *